(12) United States Patent
Sindhushayana et al.

(10) Patent No.: US 7,051,268 B1
(45) Date of Patent: May 23, 2006

(54) METHOD AND APPARATUS FOR REDUCING POWER CONSUMPTION OF A DECODER IN A COMMUNICATION SYSTEM

(75) Inventors: Nagabhushana T. Sindhushayana, San Diego, CA (US); Peter J. Black, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 441 days.

(21) Appl. No.: 09/675,704

(22) Filed: Sep. 29, 2000

(51) Int. Cl.
*H03M 13/00* (2006.01)
*H03M 13/03* (2006.01)

(52) U.S. Cl. ............... 714/786; 714/755; 714/760; 375/262; 375/341

(58) Field of Classification Search ............ 714/786, 714/752, 797, 799; 375/317, 299; 341/126
See application file for complete search history.

(56) References Cited

U.S. PATENT DOCUMENTS

| | | | |
|---|---|---|---|
| 4,901,307 A | 2/1990 | Gilhousen et al. | 370/18 |
| 5,103,459 A | 4/1992 | Gilhousen et al. | 375/1 |
| 5,406,613 A | 4/1995 | Peponides et al. | 379/58 |
| 5,504,773 A | 4/1996 | Padovani et al. | 375/200 |
| 5,761,248 A | 6/1998 | Hagenauer et al. | 375/340 |
| 6,182,261 B1 * | 1/2001 | Haller et al. | 714/758 |
| 6,526,531 B1 * | 2/2003 | Wang | 714/704 |
| 6,542,558 B1 * | 4/2003 | Schulist et al. | 375/340 |

FOREIGN PATENT DOCUMENTS

EP 1022860 A1 7/2002

OTHER PUBLICATIONS

IEEE: Schurgers et al. "Adaptive turbo decoding for indoor wireless communication, Oct. 2, 1998", Interuniversity micro electronic center (IMEC), pp. 107-111.*

Hagenauer, et al. "Iterative Decoding of Binary Block and Convolutional Codes" IEEE Transactions on Information Theory 42(2): 429-445 (1996).

W. Oh et al., "Adaptive Channel SNR Estimation Algorithm for Turbo Decoder," IEEE Communications Letters, IEEE Service Center, Piscataway, US, vol. 4, No. 8, Aug. 2000, pp. 255-257.

* cited by examiner

*Primary Examiner*—Albert Decady
*Assistant Examiner*—Esaw Abraham
(74) *Attorney, Agent, or Firm*—Philip Wadsworth; Sandra L. Godsey; Pavel Kalousek

(57) ABSTRACT

A method and an apparatus for reducing power consumption of a decoder in a communication system are disclosed. In a communication system communicating a packet, the packet can be arranged among slots of a communication channel so that each slot following the first slot contains redundant bits of the packet with respect to the first slot. A receiving station estimates quality metric of a received slot, determines a quality metric threshold, and delimits an interval in accordance with the modified quality metric threshold. If the estimated quality metric is outside of the interval, the segment is decoded. The decoding process comprises delimiting a plurality of intervals in accordance with the quality metric threshold, associating each of the plurality of intervals with one of a plurality of parameters, determining an interval from the plurality of intervals into which the estimated quality metric belongs; and decoding the received signal for a number of iterations equal to the one of a plurality of parameters associated with the determined interval. In the course of the decoding process, a stopping criterion is evaluated, and the decoding process is terminated in accordance with the stopping criterion.

40 Claims, 2 Drawing Sheets

METHOD AND APPARATUS FOR REDUCING POWER CONSUMPTION OF A DECODER IN A COMMUNICATION SYSTEM

BACKGROUND OF THE INVENTION

I. Field of the Invention

The current invention relates to communications. More particularly, the present invention relates to a novel method and apparatus for reducing power consumption of a decoder in a communication system.

II. Description of the Related Art

Several communication systems exchange data organized into packets, among the terminals in a communication system. For the purposes of this description, a packet is a group of bits, including data (payload) and control elements, arranged into a specific format. The packets to be communicated are formatted in accordance with a selected communication channel structure. In general, a communication channel structure is comprised from smallest organizational structures, e.g., slots. For the purposes of this description, a slot is a fixed time interval comprising a variable number of bits depending on a data rate. When the number of bits of a packet exceeds the number of bits in a slot, the packet must be communicated over several slots as a multi-slot packet. The packet may be arranged among the slots of the communication channel structure so that each slot following the first slot contains redundant bits of the packet with respect to the first slot. Consequently, the whole payload content of a currently sent packet has been communicated to a receiving station when the first slot has been communicated. Therefore, if the receiving station can decode the current packet before it has been transmitted in its entirety, it can notify a transmitting station, and the transmission of the current packet can be terminated, thereby increasing the effective data rate.

The straightforward method of determining whether a current packet can be decoded early is to attempt decoding after each slot of the multi-slot transmission. However, this strategy results in high power consumption by the decoder.

Consequently, there is a need for a strategy aimed at minimizing decoder power consumption, while providing the benefits of early termination.

SUMMARY OF THE INVENTION

The present invention is directed to a novel method and apparatus for a method for reducing power consumption of a decoder in a communication system. Accordingly, in one aspect of the invention, a quality metric of a segment of a received signal is estimated. Then, a quality metric threshold is determined and an interval in accordance with a modified quality metric threshold is delimited. If the estimated quality metric is outside of the interval, the segment is decoded.

In another aspect, the decoding process comprises delimiting a plurality of intervals in accordance with the quality metric threshold, associating each of the plurality of intervals with one of a plurality of parameters, determining an interval from the plurality of intervals into which the estimated quality metric belongs; and decoding the received signal for a number of iterations equal to the one of a plurality of parameters associated with the determined interval.

In another aspect, a stopping criterion is evaluated in the course of the decoding process, and the decoding process is terminated in accordance with the stopping criterion.

BRIEF DESCRIPTION OF THE DRAWINGS

The features, objectives, and advantages of the present invention will become more apparent from the detailed description set forth below when taken in conjunction with the drawings in which like reference characters identify elements correspondingly throughout and wherein.

DETAILED DESCRIPTION OF PREFERRED EMBODIMENTS

Overview

Figure 1:
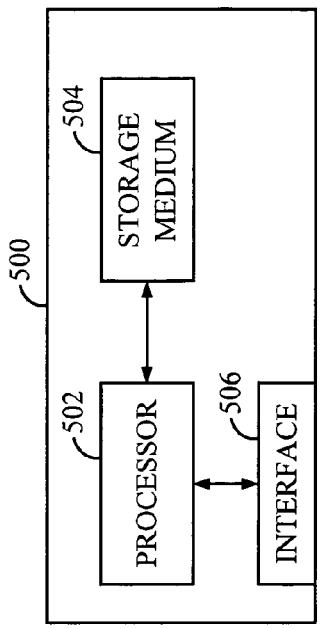
FIG. 1 illustrates an exemplary communication system capable of implementing embodiments of the invention.

FIG. 1 illustrates an exemplary communication system 100 capable of implementing embodiments of the invention. A transmitting station (TS) 102 transmits signals to a receiving station (RS) 104 over a forward link 106A. Because the signals transmitted from the TS 102 contain user data, the forward link must comprise at least a traffic channel. The TS 102 receives signals from the RS 104 over a reverse link 106B. Because the signals transmitted from the RS 104 do not need to contain user data, the reverse link need not comprise a traffic channel. If a two-way user data communication is desired, both the forward link 106A and the reverse link 106B must comprise traffic channels. For simplicity, the communication system 100 is shown to include only two stations. Such a system can represent, e.g., two computers communicating with each other. However, other variations and configurations of the communication system 100 are possible. In a multi-user, multiple-access communication system, single TS may be used to concurrently or sequentially transmit data to and receive data from a number of RSs.

There are several multi-user, multiple-access communication systems, utilizing techniques such as: time division multiple-access (TDMA), frequency division multiple-access (FDMA), amplitude modulation (AM) schemes, and other techniques known in the art. Another type of multi-user, multiple-access communication system technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

The communication system 100 may carry voice and/or data. Examples comprise communication systems conforms to the "3rd Generation Partnership Project" (3GPP) and embodied in a set of documents including Document Nos.

3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard). Another example of a communication system carrying both voice and data is a system in accordance with the IS-95 standard, which specifies transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, the traffic data or voice data is partitioned into code channel frames that are 20 milliseconds wide with data rates as high as 14.4 Kbps.

An example of a data only system is a high data rate (HDR) system, such as a system disclosed in application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003, assigned to the assignee of the present invention and incorporated by reference herein.

The forward link 106A and the reverse link 106B can propagate through a guiding media, e.g., a wire, a coaxial cable, an optical cable or other media known to one skilled in the art, or in case of wireless link through free space.

The communication system 100 may employ variable data rate transmission on the forward link 106A. Such a system, disclosed in application Ser. No. 08/963,386, defines a set of data rates, ranging from 38.4 kbps to 2.4 Mbps, at which an access point (e.g., TS 102) may send data packets to an access terminal (e.g., RS 104). In one embodiment, the data rate is determined by a data rate selection method at the RS 104, and a scheduler method at the TS 102. Although the data rate determination is described in terms of the data rate selection method and the scheduler method, one of ordinary skill in the art will understand that this is for illustration only, and any data rate determination method can be used.

Data Rate Selection Method

A rate control method enables an RS (e.g., RS 104) to determine the TS from which the RS 104 can receive the best throughput. The rate control method further enables the RS 104 to estimate the maximum data rate at which the RS 104 can receive the next signal segment from the selected TS.

In one embodiment, each TS in the communication system 100 transmits known signal, called a pilot signal, at well-defined, periodic intervals. The RS 104 monitors the pilot signals received from the TSs in the RS 104 active set, and utilizes the pilot signals to determine a quality metric associated with each TS. In one embodiment, the quality metric is a signal-to-interference-plus-noise ratio (SINR). For the purposes of this description, an active set is a list of pilot signals selected by the particular RS from all pilot signals received with sufficient strength to indicate that the associated forward traffic channel can be successfully demodulated. Based on the SINR information over past signal segments from each of the TSs in the RS 104 active set, the RS 104 predicts the SINR over future signal segment(s) for each of the TSs in the RS 104 active set. In one embodiment, the signal segment is a slot. An exemplary prediction method is disclosed in application Ser. No. 09/394,980 entitled "SYSTEM AND METHOD FOR ACCURATELY PREDICTING SIGNAL TO INTERFERENCE AND NOISE RATIO TO IMPROVE COMMUNICATIONS SYSTEM PERFORMANCE," now U.S. Pat. No. 6,426,971, issued Jul. 3, 2002, assigned to the assignee of the present invention and incorporated herein by reference. The RS 104 then selects the TS (e.g., TS 102), which offers the best throughput over the future slot(s), and estimates the highest data rate at which the RS 104 can receive the next packet from the TS 102. The RS 104 then sends a data rate request (DRC) to the TS 102, indicating the data rate at which the RS 104 wishes to receive the next packet.

Scheduling Method

A scheduling method enables a TS that received the DRC (e.g., TS 102) to determine an RS (e.g., RS 104), to which the TS 102 should transmit the next packet at the data rate requested by the RS 104. The scheduling method at the TS 102 monitors the sequence of DRCs from all RSs that wish to receive data from the TS 102. In accordance with the received DRCs, the TS 102 determines the RS to which the TS 102 should send the next packet, in order to maximize the forward link throughput while maintaining acceptable link performance at each RS.

Need for Early Termination

In one embodiment, employing data rate determination in accordance with the described rate control method and scheduler method, the need for early termination arises as follows.

The data rate, requested by the RS 104 via a DRC from the TS 102, is determined using the rate control method, which predicts a SINR over future slot(s) based on the SINR over past slot(s) from the TS 102. The SINR from the TS 102 is subject to rapid, unpredictable changes due to the variations in the channel. Such variations include SINR changes, fading, time variance, and other changes known to one skilled in the art. Because these variations are different for different communication channels, transmission of a signal over a wireless communication channel requires different considerations than transmission of a signal over a wire-like communication channel, e.g., coaxial cable, optical cable, and other types known to one skilled in the art. One of the factors affecting the communication channel characteristics in wireless communication systems is inter-cell interference. Such interference levels may be significantly higher during the data transmission than the interference level seen during the pilot transmission, because some of the base stations may remain idle during the data period. Consequently, it is not always possible for the RS 104 to predict the SINR with great accuracy. Therefore, the rate control method establishes a lower bound on the actual SINR during the next packet duration with high probability, and determines the maximum data rate that can be sustained if the actual SINR is equal to this lower bound. In other words, the rate control method provides a conservative measure of the rate data at which the next packet can be received.

Early termination of current packet transmission attempts to refine this estimate, based on a quality metric of a signal received during the initial slots of the current packet transmission. Based on the channel conditions, or equivalently, the initial uncertainty about the SINR over future slot(s), the RS 104 may decode the current packet before it has been transmitted in its entirety. As discussed, this significantly increases the forward link throughput of the communication system.

Early Termination of Current Packet Transmission

The following embodiment describes an early termination method, which can be used regardless of the method employed to determine a data rate, and the particular factors influencing the need for early termination.

At the end of each slot over which the RS 104 is receiving a current packet at a current data rate, the RS 104 computes a quality metric. In one embodiment, the quality metric is an average SINR. In one embodiment, each TS in the communication system 100 transmits known signal, called a pilot signal, at well-defined, periodic intervals. The RS 104 monitors the pilot signal in the slot over which the current packet was received, and utilizes the pilot signal to compute the average SINR.

For each data rate, the RS 104 maintains a table that maps a number of slots of transmission onto an average SINR required to decode a current packet with a reasonably low error rate. In one embodiment, the entries in this look-up table are based on simulation or controlled tests of RS demodulator performance under various channel conditions. Thus, the look-up table defines required packet SINR (SINR threshold) for a given data rate and for a given number of transmitted slots. Consequently, the average SINR provides an indication of a probability of successful decoding of the current packet at the current data rate, using the data from the slots received so far. One of ordinary skill in the art will further understand that although the early termination method described below is described in terms of variable data rate, this is for instructive purpose only.

An actual average packet SINR may be higher than the average SINR computed by the RS 104 because the SINR computed by the RS 104 is subjected to measurement noise, thereby inducing some uncertainty in the actual average SINR. In one embodiment, such measurement noise may be induced by interfering TSs. In one embodiment, a decoder carries out a decoding process as a series of iterations. An example of such a decoder is a turbo code decoder, described below. A general early termination method is as follows:

Let $\Delta_0 \leq \Delta_1 \leq \ldots \leq \Delta_m \leq 0 < \Delta_{m+1} \leq \Delta_{m+2} \leq \ldots \leq \Delta_{m+n}$, be real-valued parameters, and let $N_1 \leq \ldots \leq N_m \geq N_{m+1} \geq N_{m+2} \geq \ldots > N_{m+n+1}$ be non-negative, integer-valued parameters, where m, n are be non-negative, integer-valued parameters. Let AS denote the average packet SINR measured over past transmitted slot(s) of a current packet transmission, and TS denote the SINR threshold for the given data rate, over the past transmitted slot(s). Then:

If AS<TS+$\Delta_0$, do not attempt to decode the current packet with currently available data.

If TS+$\Delta_{k-1} \leq$ AS<TS+$\Delta_k$, attempt to decode the current packet with a maximum of $N_k$ iterations, for all k∈[1, m+n].

If AS≥TS+$\Delta_{m+n}$, attempt to decode the packet with a maximum of $N_{m+n+1}$ iterations.

Figure 2:
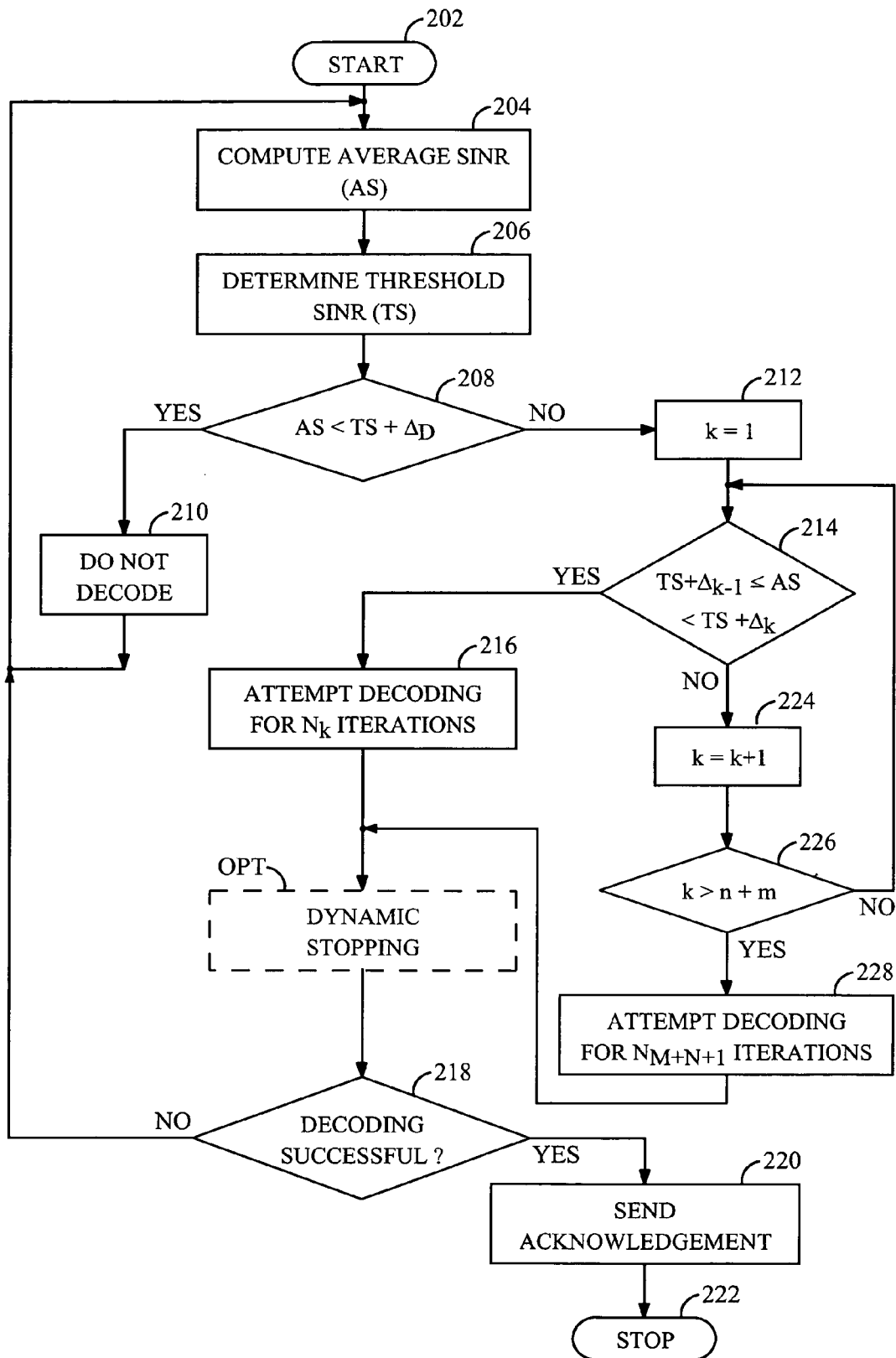
FIG. 2 illustrates a flow chart of a decoding process in accordance with one embodiment.

The decoding process in accordance with one embodiment is described in reference to FIG. 2.

The method starts in step 202 upon receiving a current packet. The method continues in step 204.

In step 204, an average SINR (AS) is computed at the end of a particular slot of a current packet transmission. The method then continues in step 206.

In step 206, an SINR threshold (TS) for the given data rate over the given number of transmitted slots is determined. The method then continues in step 208.

In step 208, a condition AS<TS+$\Delta_0$ is evaluated. In one embodiment, the parameter $\Delta_0$ is determined in accordance with a simulation or controlled test of RS demodulator performance under various channel conditions. If the condition AS<TS+$\Delta_0$ is satisfied, the method continues in step 210. If the condition AS<TS+$\Delta_0$ is not satisfied, the method continues in step 212.

In step 210, the decision not to attempt decoding with currently available data is made because the average SINR computed is considerably lower than the corresponding SINR threshold. Consequently, it is very unlikely that the packet can be correctly decoded using the data from the slots received so far. The method returns to step 204.

In step 212, an auxiliary variable k is set to a value of 1. The method continues in step 214.

In step 214, a condition TS+$\Delta_{k-1} \leq$ AS<TS+$\Delta_k$ is evaluated. In one embodiment, the parameters $\Delta_k$, $\Delta_{k-1}$ are determined in accordance with simulation or controlled test of RS demodulator performance under various channel conditions. If the condition TS+$\Delta_{k-1} \leq$ AS<TS+$\Delta_k$ is satisfied, average SINR computed is not considerably low, but still well below the SINR threshold. Consequently, the packet may be correctly decoded if the actual SINR over the slot is significantly higher than the SINR measured over the pilot signals. Therefore, the method continues in step 216. If the condition TS+$\Delta_{k-1} \leq$ AS<TS+$\Delta_k$ is not satisfied, the method continues in step 224.

In step 216, a decoding attempt with currently available data is carried out for a first pre-determined number of iterations $N_k$. The method continues in step 218. Step OPT, representing a dynamic stopping rule, interposed between step 216 and step 218, is optional. The step OPT is described below.

In step 218, a success of the decoding attempt is ascertained. In one embodiment, the success is ascertained in accordance with the method described below in connection with the dynamic stopping rule. If the decoding is unsuccessful, the method returns to step 204. If the decoding is successful, the method continues in step 220.

In step 220, an acknowledgement is sent to the TS in order for the TS to stop sending the current packet. The method continues in step 222.

In step 222, the processing of the current packet stops.

In step 224, the value of the auxiliary variable k is increased by 1. The method continues in step 226.

In step 226, the condition k>n+m is evaluated. If the condition k>n+m is satisfied, the method continues in step 228. If the condition k>n+m is not satisfied, the method returns to step 214.

In step 228, a decoding attempt with currently available data is carried out for a pre-determined number of iterations $N_{n+m+1}$. Selection of $N_{n+m+1}$ as $N_1 \leq \ldots \leq N_m \geq N_{m+1} \geq N_{m+2} \geq \ldots > N_{n+m+1}$ is reasonable because if the slot actually has a very good SINR, then the slot is very likely to be correctly decoded with a very small number of iterations.

One skilled in the art will understand that the interval testing decision steps (208, 214, and 228) is shown as being tested sequentially for illustrative purposes only. Other possibilities include parallel interval testing or a combination thereof.

In one embodiment of the invention, a dynamic stopping rule (described below) is used in conjunction with the above-mentioned rules. The dynamic stopping rule prevents the decoder from running too many iterations after the packet has been successfully decoded.

In another embodiment, a decoder carries out a decoding process as a single action. Then, the early termination method is as follows:

If AS<TS, do not attempt to decode the current packet with currently available data.

If AS≥TS, attempt to decode the packet.

Turbo Decoding with Dynamic Stopping Rule

In one embodiment of the invention, turbo codes are used for encoding packets for transmission. Turbo codes, known to one of ordinary skill in the art, are described in, e.g., Chris Heegard and Stephen B. Wicker, *Turbo Coding*(1999), which is incorporated herein by reference. Turbo decoding is an iterative procedure, in which each subsequent iteration increases the level of confidence that the packet has been successfully decoded. Consequently, a significant power saving is achieved by stopping the iterative decoding procedure as soon as the packet has been decoded successfully.

There are several dynamic stopping rules known to one of ordinary skill in the art. One embodiment may utilize cross entropy criteria to determine when to stop the iterative decoding process. Such a criterion is disclosed in "Iterative Decoding of Binary Block Codes," by Joachim Hagenauer, Elke Offer and Lutz Papke, *IEEE Trans. Information Theory*, Vol. 42, No. 2, pp. 429–445 (March 1996), which is incorporated herein by reference.

In another embodiment of the invention, when the RS 104 decides to attempt packet decoding, the iterative decoding procedure is carried out for at least a minimum number of iterations $N_{min}$, and at most a maximum number of iterations $N_{max}$. In one embodiment, $N_{min}$ and $N_{max}$ are determined in accordance with simulations or controlled tests of demodulator performance under various channel conditions. After the first $N_{min}$ iterations, a quality metric of the decoded payload is computed, and compared to a quality metric contained in the decoded packet. In one embodiment, the quality metric is a cyclic redundancy check (CRC). If the two CRCs are equal, then the CRC is said to be valid. If the CRC is valid, decoding for a successive iteration is carried out and a CRC of a decoded payload is computed, and compared to a CRC contained in the decoded packet. If the CRCs computed after two successive iterations are identical and valid, then the decoding is deemed to be successful, and terminated. If the CRCs computed after two successive iterations are not identical or not valid, decoding for additional m iterations is carried out and the test is repeated. In any case, decoding is terminated after $N_{max}$ iterations. After the first $N_{max}$ iterations, a CRC of the decoded payload is computed, and compared to a CRC contained in the decoded packet. If the two CRCs are equal, then the packet is declared successfully decoded. The above-described method is disclosed in application Ser. No. 09/350,941, entitled "EFFICIENT ITERATIVE DECODING," filed Jul. 9, 1999, now U.S. Pat. No. 6,182,261, issued Jan. 30, 2001, assigned to the assignee of the present invention, and incorporated herein by reference.

Acknowledgement Procedure

As previously mentioned, when the RS 104 successfully decodes the current packet before it has been transmitted in entirety, the RS 104 sends an acknowledgement to the TS 102. In response, the TS 102 stops sending the current packet.

Figure 3:
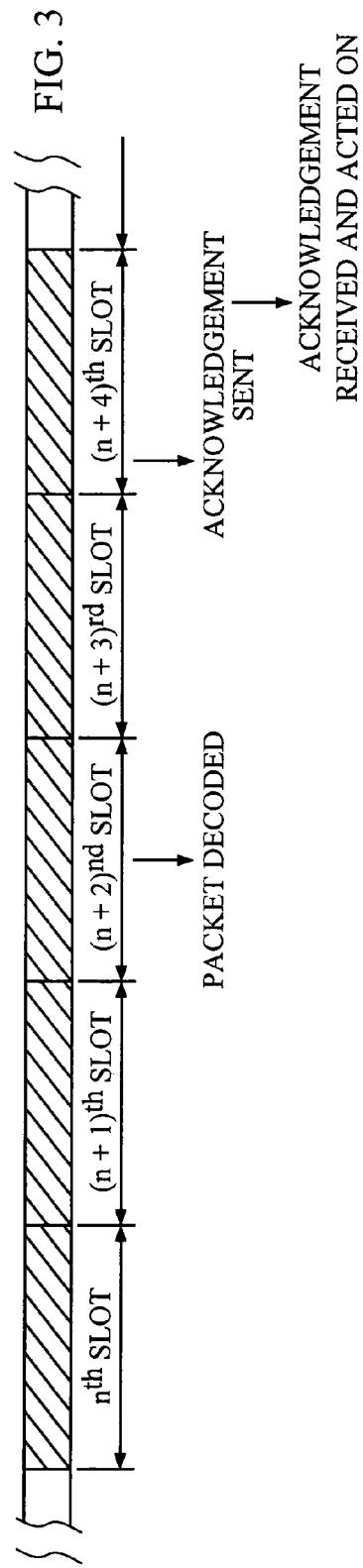
FIG. 3 illustrates a conceptual forward link structure in accordance with one embodiment of the invention.

FIG. 3 illustrates a conceptual forward link structure in accordance with one embodiment of the invention. A multi-slot packet is transmitted from TS 102 (FIG. 1) to RS 104 (FIG. 1) in successive slots. The transmission of the first slot of the starts in the n-th slot. The RS 104 decodes the packet, and verifies the CRC of the decoded result after having received the (n+1)th slot of transmission. The RS 102 informs the TS 102 about the outcome by sending a FAST_ACK signal in the slot (n+4). The TS 104 demodulates and interprets the FAST_ACK signal and terminates transmission of the current packet in the slot (n+4). Thus, although the transmission of the current packet has been terminated early, if the scheduling method retransmitted the current packet in the interval between the (n+1)th slot and the (n+5)th slot, some transmission waste occurred. One skilled in the art will understand that the correspondence between the actions and slots is for illustrative purposes only. Thus, implemented system may take different interval than two slots between decoding a slot and sending a FAST_ACK signal.

Figure 4:
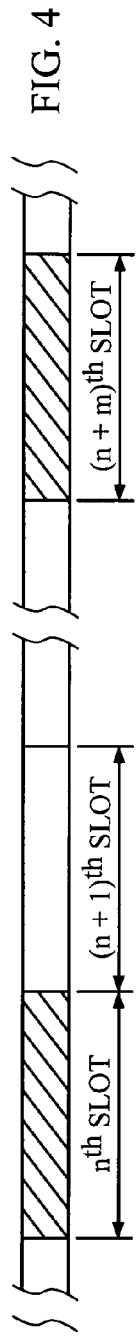
FIG. 4 illustrates a conceptual forward link structure in accordance with another embodiment of the invention.

FIG. 4 illustrates a conceptual forward link structure in accordance with another embodiment of the invention. The transmission of the first slot of a multi-slot packet from TS 102 (FIG. 1) to RS 104 (FIG. 1) starts in the n-th slot. Each successive slot of the multi-slot packet is transmitted m slots later. The value of m is determined to allow the RS 104 to decode the packet after each additional slot of transmission, verify the CRC of the decoded result, and inform the TS 102 about the outcome, before the RS 104 receives the next slot. If the RS 104 manages to decode the packet before the normal packet transmission is complete, it sends an FAST_ACK signal to the TS 102 before the next slot of the current packet is sent. The TS 102 demodulates and interprets the FAST_ACK signal sufficiently in advance to terminate transmission of the current packet. The TS 102 may then transmit a new packet to the RS 104 or a different RS, during the period in which it would have otherwise transmitted the original packet.

Note that the term "FAST_ACK signal" that is described herein is different from the acknowledge messages that may be sent by the higher layers of automatic request protocols (ARQ) such as RLP, TCP and other protocols known to one of ordinary skill in the art.

Figure 5:
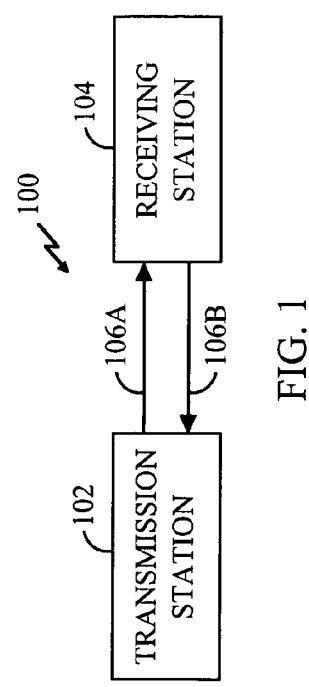
FIG. 5 illustrates a block diagram of an apparatus in accordance with one embodiment of the invention.

FIG. 5 illustrates elements of an apparatus 500 in accordance with one embodiment of the present invention.

The apparatus 500 comprises a processor 502 and a storage medium 504 accessible by the processor 502 and containing a set of instructions readable and executable by the processor 502. The apparatus 500 further comprises an interface 506 accessible by the processor 502, allowing the apparatus 500 communicate with other logical blocks, modules, circuits, and algorithm steps described in connection with the embodiments disclosed herein.

Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for reducing power consumption of a decoder in a communication system, comprising:
    estimating a quality metric of a channel associated with a segment of a received signal;
    determining a quality metric threshold;
    determining a real-valued parameter $\Delta_0$;
    defining an interval in accordance with a formula $(-\infty, TS+\Delta_0)$, where TS is the quality metric threshold; and
    decoding the segment when the estimated quality metric is outside of the interval.

2. The method of claim 1 wherein the estimating a quality metric comprises estimating a signal-to-noise ratio.

3. The method of claim 1 wherein the estimating a quality metric of a channel associated with a segment of a received signal comprises estimating a quality metric of a channel associated with a slot of a received signal.

4. The method of claim 1 wherein the determining a quality metric threshold comprises:
    determining a data rate of the segment;
    determining a number of segments received; and
    determining a quality metric threshold in accordance with the data rate and the number of segments.

5. The method of claim 1 further comprising determining the parameter $\Delta_0$ in accordance with a demodulator performance.

6. The method of claim 1 wherein the parameter $\Delta_0$ is less than or equal to zero.

7. The method of claim 1 wherein the quality metric is slot based.

8. A method for reducing power consumption of a decoder in a communication system, comprising:
    estimating a quality metric of a channel associated with a segment of a received signal;
    determining a quality metric threshold;
    delimiting a plurality of intervals in accordance with the quality metric threshold;
    associating each of the plurality of intervals with one of a plurality of parameters;
    determining an interval from the plurality of intervals into which the estimated quality metric belongs; and
    decoding the received signal for a number of iterations equal to the one of a plurality of parameters associated with the determined interval.

9. The method of claim 8 wherein the delimiting a plurality of intervals comprises:
    determining a plurality of real-valued parameters
    $\Delta_0 \leq \Delta_1 \leq \ldots \leq \Delta_m \leq 0 < \Delta_{m+1}, \leq \Delta_{m+2} \leq \ldots \Delta_{m+n}$; and
    defining the plurality of intervals in accordance with the formulas:
    $[TS+\Delta_{k-1}, TS+\Delta_k]$, for all $k \in (1, n+m)$; and
    $[TS+\Delta_{n+m}, \infty]$,
    where n, m are non-negative, integer-valued parameters, and TS is the quality metric threshold.

10. The method of claim 9 wherein the parameters $\Delta_1, \ldots, \Delta_m, \Delta_{m+1}, \Delta_{m+2}, \ldots \Delta_{m+n}$ are determined in accordance with a demodulator performance.

11. The method of claim 8 wherein the plurality of parameters comprise non-negative, integer-valued parameters $N_1 \leq \ldots \leq N_m \geq N_{m+1} \geq N_{m+2} \geq \ldots N_{n+m+1}$.

12. The method of claim 11 wherein the parameters $N_1, \ldots, N_m, N_{m+1}, N_{m+2}, \ldots N_{n+m+1}$ are determined in accordance with a demodulator performance.

13. An apparatus for reducing power consumption of a decoder in a communication system, comprising:
    a processor; and
    a processor-readable storage medium accessible by the processor and containing a set of instructions for execution by the processor to:
    estimate a quality metric of a channel associated with a segment of a received signal;
    determine a quality metric threshold;
    determine a real-valued parameter $\Delta_0$;
    define an interval in accordance with a formula $(-\infty, TS+\Delta_0)$, where TS is the quality metric threshold; and
    decode the segment when the estimated quality metric is outside of the interval.

14. The apparatus of claim 13 wherein the quality metric is a signal-to-noise ratio.

15. The apparatus of claim 13 wherein the segment of a received signal is a slot.

16. The apparatus of claim 13 wherein the quality metric threshold is determined in accordance with a data rate of the segment and a number of segments received.

17. The apparatus of claim 13 wherein the parameter $\Delta_0$ is determined in accordance with a demodulator performance.

18. The apparatus of claim 13 wherein the parameter $\Delta_0$ is less than or equal to zero.

19. The apparatus of claim 13 wherein the quality metric is slot based.

20. An apparatus for reducing power consumption of a decoder in a communication system, comprising:
    a processor; and
    a processor-readable storage medium accessible by the processor and containing a set of instructions for execution by the processor to:
    estimate a quality metric of a channel associated with a segment of a received signal;
    determine a quality metric threshold;
    delimit a plurality of intervals in accordance with the quality metric threshold;
    associate each of the plurality of intervals with one of a plurality of parameters;
    determine an interval from the plurality of intervals into which the estimated quality metric belongs; and
    decode the received signal for a number of iterations equal to the one of a plurality of parameters associated with the determined interval.

21. The apparatus of claim 20 wherein the set of instructions is further for execution by the processor to delimit a plurality of intervals by:
    determining a plurality of real-valued parameters
    $\Delta_0 \leq \Delta_1 \leq \ldots \leq \Delta_m \leq 0 < \Delta_{m+1} \leq \Delta_{m+2} \leq \ldots \Delta_{m+n}$; and
    defining the plurality of intervals in accordance with the formulas:

$[TS+\Delta_{k-1}, TS+\Delta_k]$, for all $k \epsilon (1, n+m)$; and
$[TS+\Delta_{n+m}, \infty]$,
where n, m are non-negative, integer-valued parameters, and TS is the quality metric threshold.

22. The apparatus of claim 21 wherein the parameters $\Delta_1, \ldots, \Delta_m, \Delta_{m+1}, \Delta_{m+2}, \ldots \Delta_{m+n}$ are determined in accordance with a demodulator performance.

23. The apparatus of claim 20 wherein a plurality of parameters comprise non negative, integer-valued parameters $N_1 \leq \ldots \leq N_m \geq N_{m+1} \geq N_{m+2} \geq \ldots N_{n+m+1}$.

24. The apparatus of claim 23 wherein the parameters $N_1, \ldots, N_m, N_{m+1}, N_{m+2}, \ldots N_{n+m+1}$ are determined in accordance with a demodulator performance.

25. The apparatus of claim 20 wherein the quality metric comprises a signal-to-noise ratio.

26. The apparatus of claim 20 wherein the quality metric threshold is determined in accordance with a data rate of the segment and a number of segments received.

27. A processor-readable medium for reducing power consumption of a decoder in a communication system, comprising instructions for execution by a processor to:
estimate a quality metric of a channel associated with a segment of a received signal;
determine a quality metric threshold;
determine a real-valued parameter $\Delta_0$;
define an interval in accordance with a formula $(-\infty, TS+\Delta_0)$, where TS is the quality metric threshold; and
decode the segment when the estimated quality metric is outside of the interval.

28. The processor-readable medium of claim 27 wherein the quality metric is a signal-to-noise ratio.

29. The processor-readable medium of claim 27 wherein the segment of a received signal is a slot.

30. The processor-readable medium of claim 27 wherein the quality metric threshold is determined in accordance with a data rate of the segment and a number of segments received.

31. The processor-readable medium of claim 27 wherein the parameter $\Delta_0$ is determined in accordance with a demodulator performance.

32. The processor-readable medium of claim 27 wherein the parameter $\Delta_0$ is less than or equal to zero.

33. The processor-readable medium of claim 27 wherein the quality metric is slot based.

34. A processor-readable medium for reducing power consumption of a decoder in a communication system, comprising instructions for execution by a processor to:
estimate a quality metric of a channel associated with a segment of a received signal;
determine a quality metric threshold;
delimit a plurality of intervals in accordance with the quality metric threshold;
associate each of the plurality of intervals with one of a plurality of parameters;
determine an interval from the plurality of intervals into which the estimated quality metric belongs; and
decode the received signal for a number of iterations equal to the one of a plurality of parameters associated with the determined interval.

35. The processor-readable medium of claim 34 wherein the set of instructions is further for execution by the processor to delimit a plurality of intervals by:
determining a plurality of real-valued parameters
$\Delta_0 \leq \Delta_1 \leq \ldots \leq \Delta_m \leq 0 < \Delta_{m+1} \leq \Delta_{m+2} \leq \ldots \Delta_{m+n}$; and
defining the plurality of intervals in accordance with the formulas:
$[TS+\Delta_{k-1}, TS+\Delta_k]$, for all $k\epsilon(1, n+m)$; and
$[TS+\Delta_{n+m}, \infty]$,
where n, m are non-negative, integer-valued parameters, and TS is the quality metric threshold.

36. The processor-readable medium of claim 35 wherein the parameters $\Delta_l, \ldots, \Delta_m, \Delta_{m+1}, \Delta_{m+2}, \ldots \Delta_{m+n}$ are determined in accordance with a demodulator performance.

37. The processor-readable medium of claim 34 wherein a plurality of parameters comprise non-negative, integer-valued parameters $N_1 \leq \ldots \leq N_m \geq N_{m+1} \geq N_{m+2} \geq \ldots N_{n+m+1}$.

38. The processor-readable medium of claim 37 wherein the parameters $N_1, \ldots, N_m, N_{m+1}, N_{m+2}, \ldots N_{n+m+1}$ are determined in accordance with a demodulator performance.

39. The processor-readable medium of claim 34 wherein the quality metric comprises a signal-to-noise ratio.

40. The processor-readable medium of claim 34 wherein the quality metric threshold is determined in accordance with a data rate of the segment and a number of segments received.

* * * * *